April 10, 1928. 1,665,737
J. J. GOUGH
AUTOMATIC SWITCHING CORD REEL
Filed Nov. 4, 1925 2 Sheets-Sheet 1
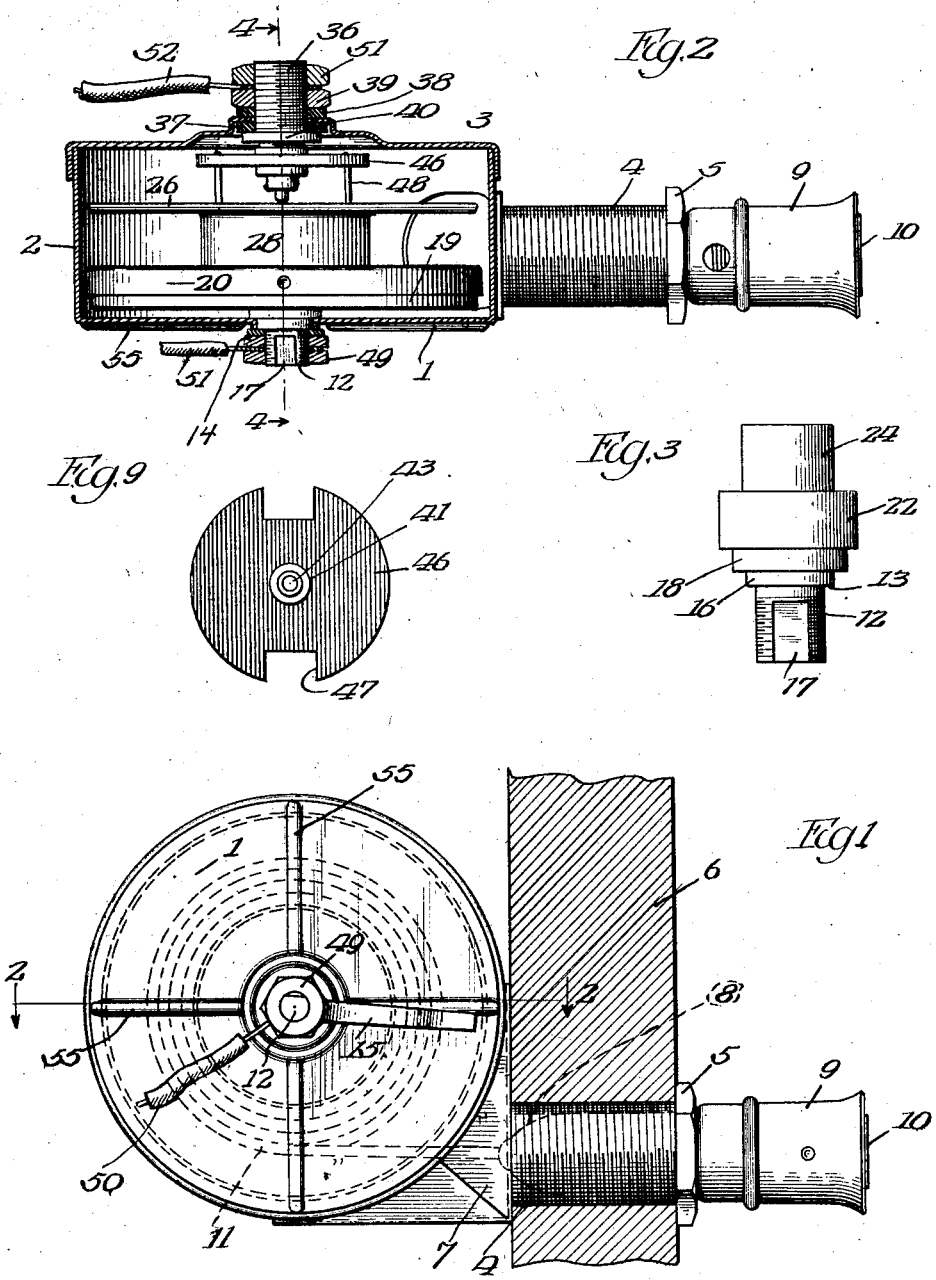

April 10, 1928.
J. J. GOUGH
1,665,737
AUTOMATIC SWITCHING CORD REEL
Filed Nov. 4, 1925     2 Sheets-Sheet 2
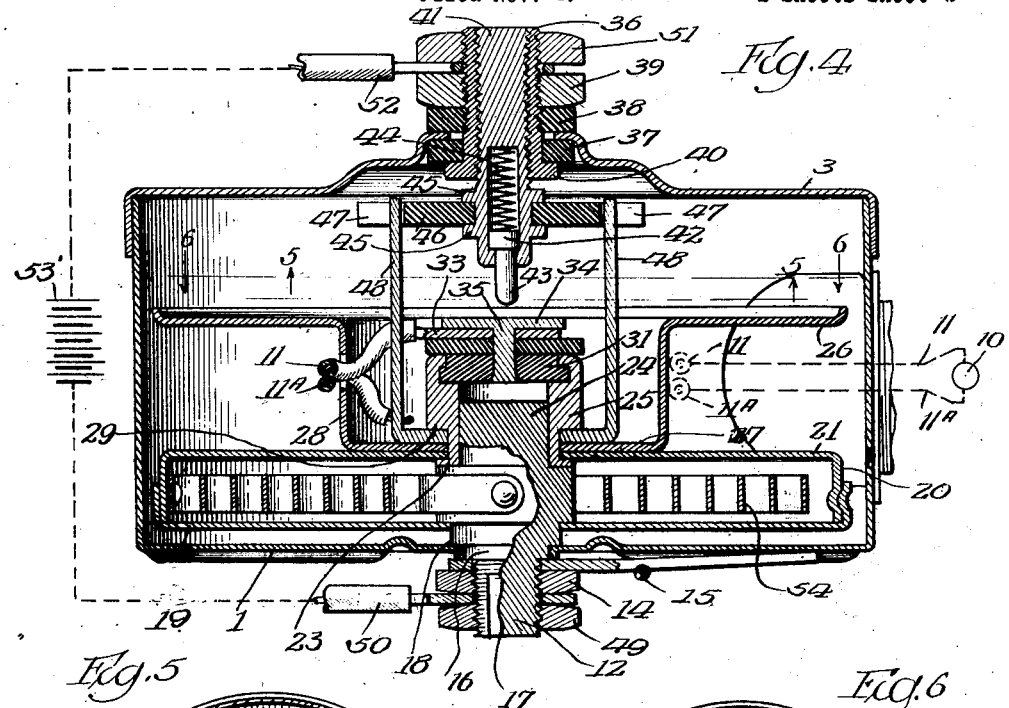
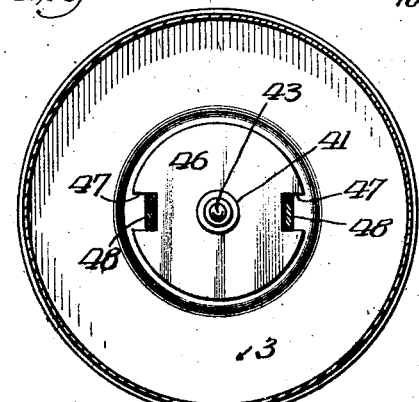
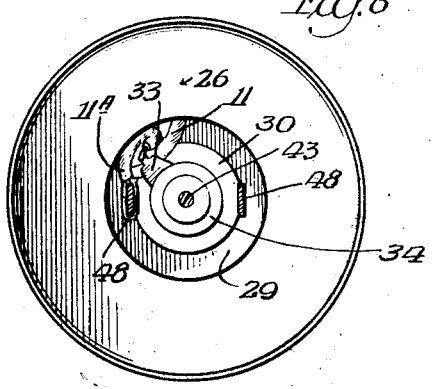
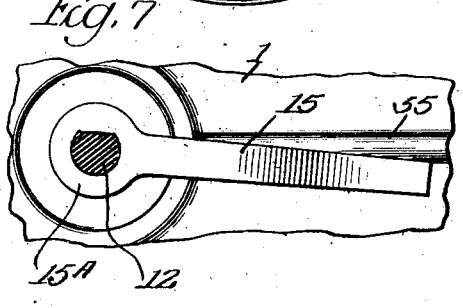
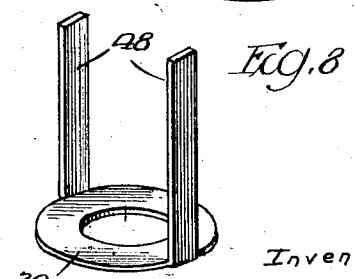
Inventor:
James J. Gough
by Albert Scheible
Attorney Patented Apr. 10, 1928.

1,665,737

UNITED STATES PATENT OFFICE.

JAMES J. GOUGH, OF CHICAGO, ILLINOIS, ASSIGNOR TO CHICAGO ELECTRIC MANUFACTURING CO., OF CHICAGO, ILLINOIS, A CORPORATION OF ILLINOIS.

AUTOMATIC SWITCHING-CORD REEL.

Application filed November 4, 1925. Serial No. 66,726.

My invention relates to means for automatically controlling the circuit through a conductor wound on a reel, so as to open the circuit when the conductor is wound on the reel and so as to close the circuit when the conductor has been unwound to at least a predetermined extent.

Where a spring-retracted reel is used in connection with twin conductors leading to a trouble lamp or an electric cigar lighter, as now employed on automobiles, the current is only needed when the conductors are at least partially unwound from the reel and hence should be positively interrupted when the conductors are wound on the reel to the full extent. In the case of an electric cigar lighter of the reel type mounted on the dashboard of an automobile, the user requires a considerable extension of the flexible cord for conveniently reaching his cigar or pipe, hence it is also desirable that the current should be turned on during a considerable part of the time required for the needed unwinding of the cord, so as to utilize this time interval for heating the resistance element of the lighter to the proper degree. Furthermore, it is desirable that the current should be switched on and off automatically, so as not to require any manipulation of the device other than the manual drawing out of the cord and the releasing of the cord after the lighter has been used.

Generally speaking, my invention aims to provide a simple, inexpensive and durable construction of a spring-retracted reel for such purposes, which will automatically and positively control the circuit according to the unwinding of the cord. More particularly, my invention provides a construction for this purpose in which the switching mechanism is operated by the rotation of the reel, in which wear at the contact points of the switching mechanism is minimized, and in which this switching mechanism is rugged in construction and easily adjusted as to the minimum cord unwinding to which it is responsive. It also provides an arrangement which will lend itself to a convenient attaching of the circuit wires and which will permit the casing of the lighter to be opened without disconnecting or disarranging any part of the switch mechanism.

Still further and also more detailed objects will appear from the following specification and from the accompanying drawings, in which Fig. 1 is side elevation of an electric cigar lighter embodying my invention, together with a transverse section through a dashboard to which it is attached, with the flexible cord shown in dotted lines.

Fig. 2 is a horizontal section taken through the cigar lighter of Fig. 1 along the line 2—2, with the flexible cord or twin conductor omitted.

Fig. 3 is an elevation of the shaft on which the reel is mounted.

Fig. 4 is an enlarged section taken through the cigar lighter of Fig. 2 along the line 4—4.

Fig. 5 is a longitudinal section taken along the line 5—5 of Fig. 4 and looking upward, but drawn on a reduced scale.

Fig. 6 is a similarly reduced section taken along the same line but looking in the opposite direction.

Fig. 7 is a fragmentary front elevation, looking upward from the bottom of Fig. 4 and showing the means for latching the shaft against rotation.

Fig. 8 is a perspective view of the forked member which forms part of the actuating connection between the reel and the switching member.

Fig. 9 is an elevation of the notched insulating disc which forms another part of this actuating connection.

In the drawings, the housing of the device includes a cup-shaped main casing portion having a circular front wall 1 and a cylindrical side wall 2, a slip cover 3 affording the rear wall of the housing, and a tubular socket 4 opening into the casing eccentric of the latter. This socket 4 is desirably threaded to fit a nut 5 for clamping a dashboard 6 against a forward corner extension 7 of the casing.

The lighter proper has its forward end 8 normally socketed in the bore of the socket 4 and its rear end 9 projecting in front of the dashboard and exposing the heating wire 10. Current is carried to this heating wire by a twin conductor comprising two wires 11 and 11$^A$, which desirably are adjoined to form a twin-wire conductor 11 as shown in Fig. 1, and this twin conductor is wound on a reel rotatable about a shaft extending transversely into the casing. This shaft, as separately illustrated in Fig. 3, has its outer end 12 projecting through the casing side 1 and a shoulder 13 engaging the inner face of this casing side 1, the said end 12 being threaded to fit a nut 14 which operates through a spring finger 15 for clamping the shoulder 13 against the said inner casing face so as to prevent the shaft from moving transversely of the casing. Inwardly of the shoulder 13 the shaft has a cylindrical part which extends through a bore of corresponding diameter in the casing side 1 but which is longer than the thickness of the said side, so as to dispose the said shoulder outwardly beyond this casing side. The spring finger 15 has its hub 15^A provided with an incompletely circular aperture through which the threaded shaft end 12 extends as shown in Fig. 7, and this shaft end is flattened on one side as shown at 17 in Fig. 3 so as to fit the said non-circular aperture.

Inwardly of the casing from the cylindrical portion 16, the shaft has a larger diametered part 18 which extends through a spring-enclosing cover 19 clamped to a forwardly directed flange 20 formed at the periphery of a flat reel side 21. Still more inward, the shaft has a spring-carrying portion 22 which abuts at one end against the said reel side 21 and at its other end against an outwardly flared part 23 on one end of the tubular hub of the reel. The other free end of the shaft consists of a cylindrical stem 24 rotatably fitting the bore of this reel hub 25.

The companion reel side has its radially inner portion 27 offset from the radially outer side portion 26 and engaging the reel side 21, the parts 26 and 27 being connected by a tubular portion 28 which forms the drum on which the twin-conductor cord 11 is wound. The hub 25 has an outwardly directed annular shoulder 29 bearing against the ring-shaped central portion 30 of the actuating member which is separately illustrated in Fig. 8, so that the flaring of the hub end flange 23 clamps this portion 30 and the two reel sides against the shoulder 29 and hence makes a rigid assembly of the hub, the two reel sides and the said actuating member.

The other end of the tubular hub 25 has an insulating washer 31 mounted in it and a second insulating washer 32 bearing against its free end, which latter washer supports an eye 33 secured to the inner end of the wire 11. Bearing against this eye 33 is the head 34 of a conductor terminal which has its stem 35 extending through the bores of the said eye and the washers 31 and 32 and which clamps these parts into a rigid assembly, thereby mounting the said terminal rigidly on the hub of the reel.

Extending through the casing cover or side 3 of the casing is a tubular circuit terminal 36 which is insulated from this casing side by washers 37 and 38 and clamped to this casing side by a nut 39 threaded on the terminal, the latter having an inner head 40 engaging the inner washer 37. Threaded into the bore of the circuit terminal 36 is a plunger carrier 41 which has its inner end portion bored out to afford a cylinder housing the head 42 of a plunger which has its stem 43 projecting through the contracted forward end of the cylinder bore towards the contact head 34 of the conductor terminal. This plunger is continuously pressed toward the conductor terminal by a compression spring 44 within the cylinder, but is limited as to its movement in the said direction by the engagement of the plunger head 42 with the end of the cylinder, as shown in Fig. 4, so that the plunger stem is out of engagement with the conductor terminal when the plunger carrier is in its outward position of Fig. 4 in which it is disposed when the conductor is completely wound on the reel so as to socket the lighter head after the manner of Figs. 1 and 2.

Rigidly secured to the plunger carrier, as by clinching it between a pair of radial flanges 45 on the latter, is an insulating disc 46 which has a pair of oppositely disposed peripheral notches 47 as shown in Figs. 5 and 9. Extending respectively through these notches are the arms 48 of the companion actuating member which has its ring-shaped base 30 secured to the hub of the reel as heretofore described, each of the arms being of such a size as to slide fully through the adjacent notch transversely of the insulating disc or in a direction parallel to the axis of the reel. This axis preferably coincides with that of the threaded plunger carrier 36 and of the plunger stem 43, and the free end of this stem is desirably rounded so that its engagement with the contact head 34 of the conductor terminal is also on the same axis, thereby reducing friction and wear at the contact.

To facilitate the installation of my device, I desirably employ the projecting threaded members at opposite sides of the casing as terminals by employing two auxiliary nuts, namely a nut 49 threaded on the shaft end 12 and clamping the tip of a circuit wire 50 against the nut 14, and a nut 51 threaded on the plunger carrier 36 and clamping the end of the companion circuit wire 52 against the nut 39. Thus arranged, the circuit from the battery 53 to the heating wire 10 of the lighter is interrupted by the gap between the tip of the plunger stem 43 and the cord terminal head 34 when the switching member is in the inoperative position as shown in Fig. 4, namely the position to which the switching member is moved through the interengaging actuating members when the cord is fully wound on the reel through the retracting action of a coiled spring which is secured at its inner end to the shaft part 22 and at its outer end to the cylindrical part 20 of the reel side 21. When the lighter proper is drawn away from the dashboard to unwind the cord from the reel, the arms 48 and the notched insulator 46 cooperate in rotating the switching member with the reel, and the threaded connection of the switching member to the stationary circuit terminal 36 causes the switching member to move with a spirally advancing motion toward the contact head 34. As soon as this longitudinal movement of the switching member brings its plunger tip into engagement with the contact head 34 of the cord terminal, the circuit is closed. The continued rotation of the reel in the same direction by a further pulling out of the cord moves only the plunger carrier 41 further towards the cord terminal, while the companion spring 44 holds the plunger in good contacting engagement with the cord terminal, so that the circuit is closed as long as the cord lighter proper is at or beyond the adjusted minimum distance from the lighter socket 4.

To prevent the spring from rotating the shaft of the device, I provide the casing side 1 with outwardly directed radial ribs 55, any one of which may be engaged by the spring finger 15, thereby also permitting the tension of the spring to be adjusted by loosening the nuts 14 and 49 and then rotating the spring and shaft with respect to the casing. By providing exposed circuit connections as shown in Figs. 2 and 4, I facilitate the wiring, and by employing slidably interfitting parts on the two interengaging actuating members I can mount one circuit terminal on a cover or side which is detachable from the body of the casing without disturbing the arrangements of other parts. When this detachable side is removed from the body of the casing, the switching member can be rotated by manipulating the insulator 46, thus providing simple means for adjusting the inoperative position of the switching member.

With the illustrated construction, the entire reel, shaft, hub and spring arrangement can be assembled as a unit while outside the casing, and the inner ends of the conductor wires can easily be secured in position, the electrical connection from one of these wires to the shaft being conveniently made by soldering this wire 11ᴬ to one of the arms 48.

However, while I have illustrated and described my invention as embodied in a device in which the current-consuming portion serves as a cigar lighter, I do not wish to be limited to its use in that connection. Neither do I wish to be limited to the details of the construction and arrangement above described, as many changes might obviously be made without departing either from the spirit of my invention or from the appended claims.

I claim as my invention:

1. The combination with a rotatable reel, of a conductor wound thereon, a terminal connected to one end of the conductor, a stationary circuit terminal spaced from the conductor terminal transversely of the reel, a switching member threaded on one of the terminals on an axis identical with that of the reel and extending transversely of the reel toward the other terminal, the other terminal having a contact face adapted to be engaged by the switching member; and means fast with respect to the said other terminal and engaging the switching member whereby a rotation of the reel rotates the switching member so as to cause the switching member to move towards or away from the said contact face; the switching member including a metal body portion threaded on the said one of the terminals and a spring-pressed plunger carried by and projecting beyond the said body portion toward the said contact face.

2. The combination with a rotatable reel, of a conductor wound thereon; a pair of spaced terminals, means electrically connecting the conductor to one thereof, a switching member threaded on one of the terminals and extending axially of the reel toward the other terminal, an operating element fast on the switching member and projecting radially thereof, and an arm fast with respect to the said other terminal and engaging the said element to cause a rotation of the reel to rotate the switching member.

3. In a device of the class described, a casing grounded to one terminal of a circuit, a shaft mounted within the casing and terminating at a distance from one side of the casing; a reel rotatably mounted on the shaft; a pair of conductors wound on the reel, one of the conductors being electrically connected through the reel and the shaft to the casing; a contact member fast upon but insulated from the reel and extending across the axis of the shaft between the shaft and the said side of the casing; a circuit terminal member mounted on, but insulated from, the said side of the casing; a switching member threaded upon one of the aforesaid members and extending axially of the shaft towards the other thereof, so that the threaded connection will cause a rotation of the switching member to move the latter axially of the shaft to engage the said other member, one of the thus engageable members being compressible; and actuating means interposed between the reel and the switching member whereby the switching member rotates with the reel.

4. A switching device as per claim 1, in which the switching member includes a body part threadedly connected to the circuit terminal member, an extension part slidably mounted on the body part and directed toward the said other member, and a compression spring interposed between the two parts, the said two parts having interengaging formations for limiting the sliding of the extension part on the body part toward the said other member.

5. A switching device as per claim 1, in which the actuating means comprise an insulator mounted on the switching member and having an opening therein, and an arm fast on the reel and extending parallel to the axis of the reel slidably through the said opening.

6. A switching device as per claim 1, in which the actuating means comprise an insulating disc fast on the switching member and having a pair of peripheral notches, and a member fast on the reel and having a pair of arms disposed parallel to the axis of the reel and respectively extending through the said notches.

7. In a device of the class described, a casing, a shaft fast on one side of the casing and extending transversely of the casing part of the way toward the other side thereof, a hollow terminal mounted on the said other side of the casing in axial alignment with the shaft, means insulating the hollow terminal from the said other side of the casing, a reel rotatable on the shaft, a contact terminal carried by the reel and having a face disposed transversely across the axis of the shaft, means insulating the contact terminal from the reel, a conductor wound on the reel and having its ends electrically connected respectively to the shaft and the contact terminal, a switching member threaded into the bore of the hollow terminal and extending toward the contact terminal so that its threading will cause rotation of the switching member in one direction to move the switching member into engagement with the said face of the contact terminal, and actuating means interposed between the reel and the switching member whereby the switching member rotates with the reel.

8. In a device of the class described, a casing, a reel rotatably mounted in the casing, a circuit terminal carried by but insulated from a wall of the casing, a contact member carried by and insulated from the reel, a conductor wound on the reel and having one end connected to the contact member and its other end grounded to the casing, a switching member threaded into the circuit terminal and extending axially of the reel toward the contact member, and a pair of slidably interengaging members respectively fast on the reel and the switching member for operatively connecting the reel with the switching member to rotate the switching member conjointly with the rotating of the reel.

9. A device as per claim 7, in which one of the interengaging members includes an arm extending laterally of and substantially parallel to the axis of the reel and secured to the reel; the other of the interengaging members comprising a compressible conducting member having one end portion threaded on the circuit terminal and its other end adjacent to and adapted to engage the contact terminal, and an element fast on the said end portion and slidably engaged by the said arm.

10. In a device of the class described, a reel comprising a pair of side portions and a hub connecting the said reel portions, a shaft on which the hub is journaled, a conductor wound on the reel, a conductor terminal carried by the hub, and presenting a contact face extending across the axis of the hub, a stationary circuit terminal spaced from the said face, a switching member threaded upon one of the said terminals coaxial with the hub and adapted to contact with the said face on the said axis, and operating means interposed between the reel and the switching member for causing the switching member to rotate with the reel.

11. A device as per claim 7, in which the side portions of the reel have parts thereof in flatwise engagement and in which the operating means include an element having a portion disposed between one of the said parts and a part of the hub, the hub being constructed for simultaneously securing the said reel parts and the said element to one another.

12. A device as per claim 7, including an insulator mounted on one end of the hub and carrying the conductor terminal.

Signed at Chicago, Illinois, October 31st, 1925.

JAMES J. GOUGH.